Oct. 11, 1955   L. MACARDIER   2,720,552
ARRANGEMENT FOR THE MECHANICAL FIXING OF INSULATORS
Filed Feb. 15, 1952   3 Sheets-Sheet 1
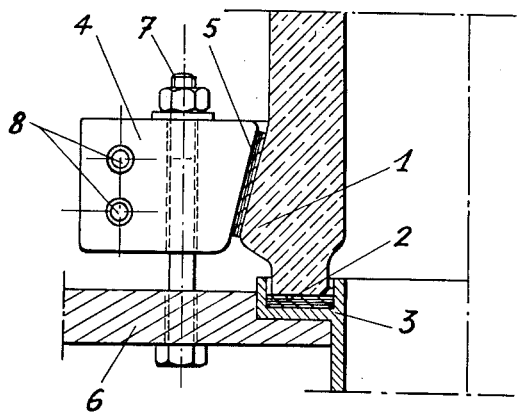
_fig:1_
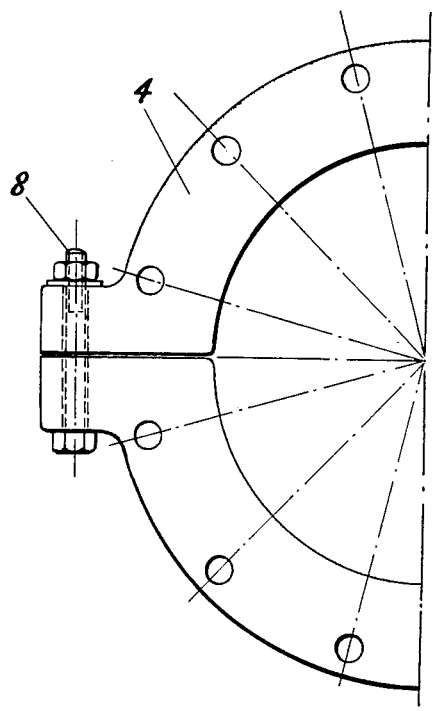
_fig:2_
INVENTOR
LOUIS MACARDIER
By Adams & Bush
ATTORNEYS Oct. 11, 1955  L. MACARDIER  2,720,552
ARRANGEMENT FOR THE MECHANICAL FIXING OF INSULATORS
Filed Feb. 15, 1952  3 Sheets-Sheet 2
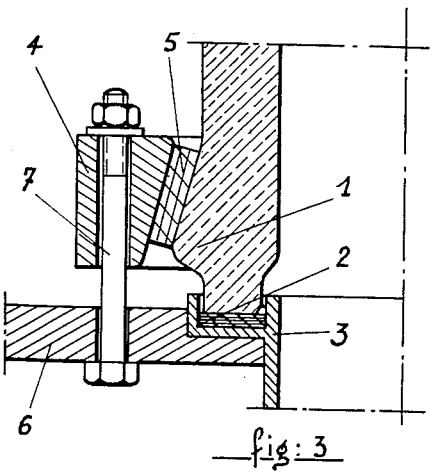
fig: 3
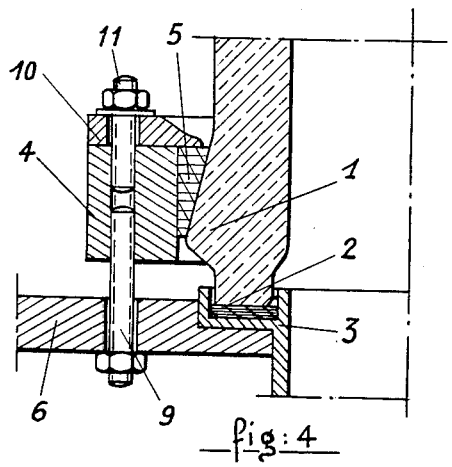
fig: 4
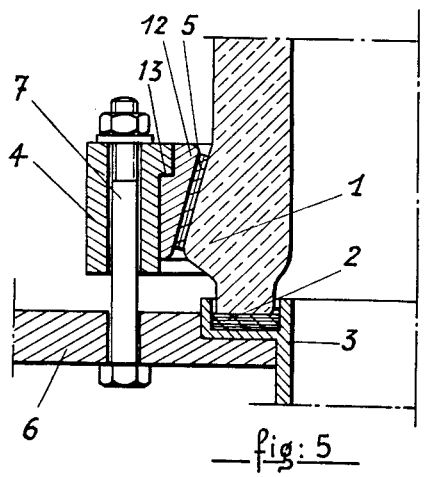
fig: 5
INVENTOR
LOUIS MACARDIER
By Adams & Buch
ATTORNEYS Oct. 11, 1955 L. MACARDIER 2,720,552
ARRANGEMENT FOR THE MECHANICAL FIXING OF INSULATORS
Filed Feb. 15, 1952 3 Sheets-Sheet 3
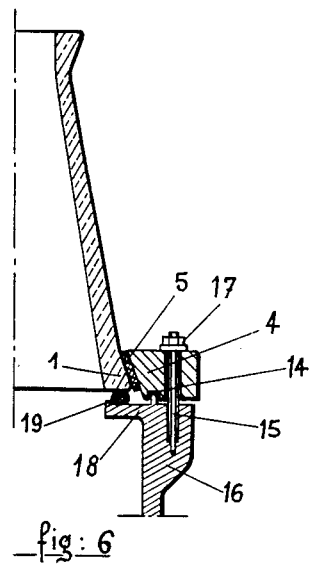
_fig: 6_
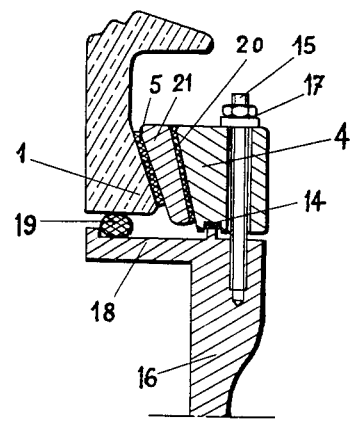
_fig: 7_
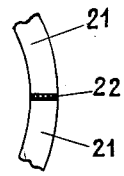
_fig: 8_
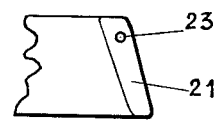
_fig: 9_
INVENTOR
LOUIS MACARDIER
By Adams & Bush
ATTORNEYS United States Patent Office 2,720,552
Patented Oct. 11, 1955

2,720,552

ARRANGEMENT FOR THE MECHANICAL FIXING OF INSULATORS

Louis Macardier, Lyon, France, assignor to Compagnie Generale d'Electricite, Paris, France, a corporation of France Application February 15, 1952, Serial No. 271,837

5 Claims. (Cl. 174—163)

This invention relates to arrangements for securing electrical insulators.

The fixing of porcelain insulators on terminal boxes or in the check joints of electric cables is at present carried out either by sealing or by mechanical gripping at spaced points by means of metal fingers bearing on bosses of the insulators. For gas or oil pressure cables, these arrangements have resulted in numerous incidents, especially as regards safety, for a length of time, of these securing arrangements.

The fixing of the insulators, generally made of porcelain, employed for the output terminals of electrical apparatus in which relatively high internal pressures obtain, often presents disadvantages on account of the wrenching forces to which this fixture is subjected. Actually, at the point of fixing or abutment, the porcelain must withstand, in addition to the wrenching force due to the internal pressure, a force in the same direction for compressing the packing. The clamping of the packing is always delicate and may, in certain cases, be excessive, and this sometimes causes fractures in the porcelain insulators.

It is an object of the present invention to overcome or minimise the above disadvantages.

According to the invention there is provided means for mechanically fixing an insulator to an electrical apparatus comprising a conically faced portion of an insulator, a metal clamping ring for surrounding the same portion, an annular shock absorbing cushion of compressible material disposed between said ring and said portion, and means for applying a clamping force to said ring in a direction towards the divergence of said conically shaped portion.

Other features of the invention will be apparent from the description which is given hereinafter.

For a better understanding of the invention and to show how the same may be carried into effect reference will now be made to the accompanying drawings in which:

Figures 1, 3, 4, 5, 6 and 7 are half-sectional views of various embodiments of the insulator securing device.

Figure 2 is a plan view of a clamp shown in Figure 1.

Figures 8 and 9 are detail views of parts of the securing device.

Referring now to the drawings, in Figure 1, the base of the porcelain insulator comprises a conical heel 1; a packing 2 ensures the tightness between the porcelain and a metal element 3 which serves as a sleeve for introducing the cable into the insulator. A metal ring made in two or more parts and forming a clamp 4 is formed on its inner face as a cone having the same inclination as the heel 1 of the insulator. A cushion 5 of a slightly compressible material which does not deteriorate in use is interposed in the form of a ring in two or more sectors between 1 and 4. The clamp 4 is connected to a metal foundation plate 6 by assembly bolts 7. 8 represents the assembly bolts of the two halves of the ring 4. The metal foundation plate 6 supports the sleeve 3.

Figure 2 is a plan view of the clamp 4 of Figure 1, showing the assembly of the two halves of this element; the assembly lugs forming part of the clamp 4 are secured by the bolts 8.

The device described in Figure 1 renders it possible for a thin cushion to be used, irrespective of the slope and the height of the boss of the insulator. When the forces are large, there is a danger of deformation of the clamp which is made in two parts. It is therefore possible to provide one of the arrangements which are hereinafter described with reference to Figures 3, 4 and 5, in which the clamp is made in one piece.

In these different figures, the same elements are represented by the same reference numerals. The porcelain insulator is indicated by 1, the packing by 2 and the metal element to be tightly connected to the insulator by 3. In Figure 3, the metal ring forming the clamp 4 is formed on its inner face with a conical surface of the same slope as the heel of the insulator 1. The shock-absorbing cushion 5 is interposed in the form of a ring consisting of two or more sectors between 1 and 4.

The cushion 5 may be constituted of materials such as poly-vinyl chloride, neoprene, Bakelite-impregnated paper or the like, which can be used safely over a long period. The thickness of the cushion must be sufficient to permit the movement of the ring 4 to a position outside the insulator heel when positioning the ring 4, which is in one piece. The thickness of the cushion 5 is a function of its height and of the angle of the insulator heel. This angle with respect to the vertical is advantageously selected to be of the order of 15° to 20° and in any case less than 45°, in order to avoid a shearing stress on the insulator boss.

Another embodiment of the invention is shown in Figure 4. In this figure, the metal ring 4 in one piece is cylindrical and its internal diameter is slightly greater than the maximum diameter of the insulator heel. The cushion 5, which is slightly compressible and which is interposed between the member 4 and the boss 1 of the insulator, is annular and of trapezoidal section, made in two or more sectors.

The foundation plate 6 is fixed on the ring 4 by means of assembly pins 9. A metal ring 10 consisting of two or more sectors is rigidly secured to the ring 4 by means of assembly pins 11; the ring 10 applies the axial clamping force to the cushion, while the ring 4 opposes the radial thrust. The component of these forces is transmitted to the insulator by means of the cushion 5.

The arrangement according to Figure 4 avoids any shearing stress of the cushion 5.

Another embodiment is shown in Figure 5, in which the clamp 4, in one piece, exerts a gripping force on the shock-absorbing cushion 5 by means of a metal ring 12 formed of two or more sectors and having a conical inner face of the same slope as the boss of the insulator. In order to avoid the slipping of the clamp 4 at the time of clamping, this ring carries an annular shoulder 13 which is fitted in a recess of complementary shape in the element 12.

In the arrangement according to Figure 5, the thickness of the shock-absorbing cushion 5 may be considerably reduced as compared with the two preceding figures, as it does not depend on the angle of the boss or on its height.

Figure 6 shows a fixing arrangement with a self-locking joint of the large base of an insulator utilised for the output terminals of electrical apparatus. In this figure, 1 represents the conical heel of the porcelain insulator, and 5 the packing; this packing 5 is made in one piece in the form of a frusto-conical ring. 4 represents a one-piece clamp, the internal face of which is conical and has the same slope as that of the heel 1 of the porcelain insulator; the lower face of this clamp comprises a machined groove for receiving a fitted packing 14. The metal clamp 4 is also formed with holes for the passage of pins 15 which permit the assembly of the clamp 4 with the member 16 on which the insulator is to be fixed; the locking is obtained by washers and nuts 17. The member 16 comprises a metal ring 18 by which an annular and preferably round packing 19 is compressed. The ring 18 and the packing 19 serve to maintain the mounting when assembled, while there is no pressure to produce the vacuum inside the insulator, which is a normal operation in the fitting of accessories for high tension cables, before they are filled and placed under pressure.

For fixing the porcelain insulator by its small base, or when the ribs of the insulator do not permit the passage of the clamp according to Figure 6, as is generally the case, there is provided an arrangement as shown in Figure 7. In this figure, 1 is the conical heel of the insulator, 5 and 20 are the packings, 21 is a metal ring consisting of two or more sectors and interposed between the packings 5 and 20, 4 is a one-piece metal clamp capable of passing over the heel 1 of the porcelain insulator. The remainder of the arrangement is the same as that according to Figure 6.

Figure 8 shows how it is possible to obtain the joint between the sectors of the ring 21 by interposing a thin packing 22 between each sector. In order to facilitate the assembly, these packings 22 may be glued by one face on one edge of the sectors. Also for the purpose of facilitating the assembly, Figure 9 shows a sector of the ring 21 comprising a guide pin 23 which is fitted in a corresponding hole of the adjoining sector.

It is not essential, but it is preferred, that the ring 21 comprises two cones of different inclination; the inner cone, having the same slope as the heel of the porcelain insulator, and the outer cone having a smaller angle with respect to the vertical axis of the porcelain insulator, so that under the action of the internal pressure in the insulator, the clamp 4 exerts a relatively strong thrust on the ring 21, thus strongly compressing the packings 22 without this axial thrust having repercussions on the porcelain insulator. For this purpose, the internal cone of the clamp 4 has the same angle as the external cone of the ring 21.

The slope of the cone formed by the heel of the insulator is advantageously selected with an angle of 15 to 20° with respect to the vertical axis, but it may have any other value without thereby departing from the scope of the invention.

The invention renders it possible to effect the clamping of porcelain insulators over large surfaces, which avoids excessive pressures and consequently fractures of the porcelain insulators.

We claim:

1. Means for mechanically fixing an electric insulator comprising at its base a conical part having an angle of divergence with respect to the axis of the insulator of less than 45 degrees, ring means including an inelastic metal clamping ring surrounding said conical part, a thin annular shock absorbing cushion of compressible material disposed between said ring means and said conical part and having the same thickness over the entire height thereof, and means for pressing said ring means on said annular cushion in the direction of the conical part of the insulator, said ring means including a metallic connecting piece arranged between said clamping ring and said annular cushion, said connecting piece comprising on one face thereof a conical part which is in contact with said annular cushion and is complementary to the conical part of said insulator, said connecting piece further comprising another face of different slope adjacent the internal face of said clamping ring.

2. Fixing means according to claim 1, wherein said ring further comprises a second shock absorbing cushion of compressible material arranged between said connecting piece and said clamping ring.

3. Fixing means according to claim 1, said connecting piece being constituted of a plurality of stacked portions arranged end to end, and a thin packing interposed between two consecutive parts of said connecting piece.

4. Means for mechanically fixing an electric insulator comprising at its base a conical part having an angle of divergence with respect to the axis of the insulator of less than 45 degrees, ring means including an inelastic clamping ring surrounding said conical part, said clamping ring having an external shoulder, a thin annular shock absorbing cushion of compressible material disposed between said ring means and said conical part and having the same thickness over the entire height thereof, and means for pressing said ring means on said annular cushion in the direction of the conical part of the insulator, said ring means further comprising a metallic connecting piece arranged between said clamping ring and said annular cushion, said connecting piece comprising on one face thereof a conical part in contact with said annular cushion and complementary to the conical part of said insulator, said connecting piece further comprising another face in contact with the internal cylindrical face of said clamping ring and being provided with a shoulder corresponding to said external shoulder.

5. Fixing means according to claim 1, wherein said connecting piece is constituted of a plurality of stacked portions arranged end to end.

References Cited in the file of this patent

UNITED STATES PATENTS 2,491,821    Lerstrup _____ Dec. 20, 1949

FOREIGN PATENTS 154,921    Switzerland _____ Aug. 1, 1932
538,885    Great Britain _____ Aug. 20, 1941